United States Patent Office 2,989,096
Patented June 20, 1961

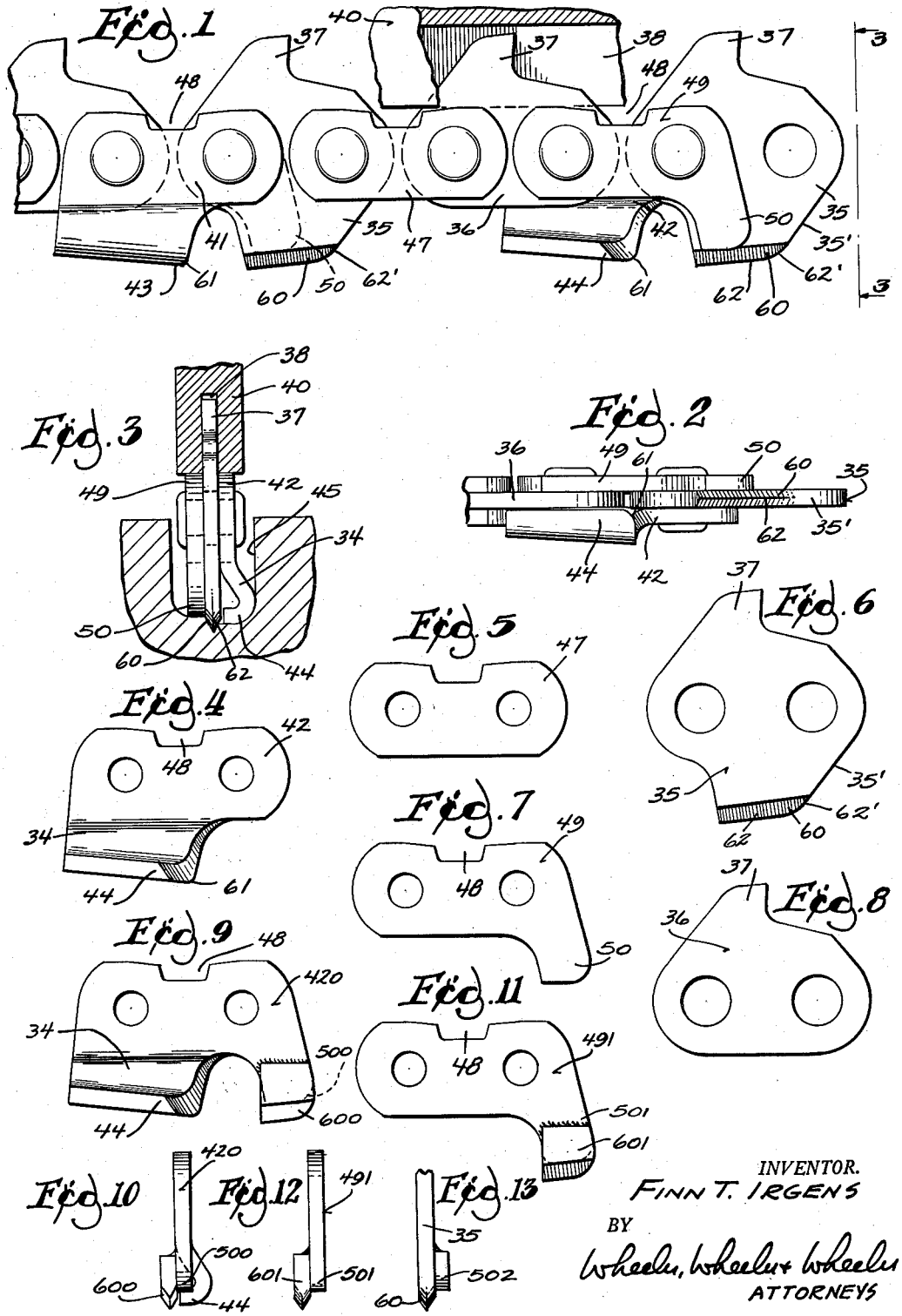
June 20, 1961  F. T. IRGENS  2,989,096
SAW CHAIN WITH A CENTER SCORING GUIDE CUTTER
Filed May 23, 1958  2 Sheets-Sheet 1
INVENTOR.
FINN T. IRGENS
BY
Wheeler, Wheeler + Wheeler
ATTORNEYS

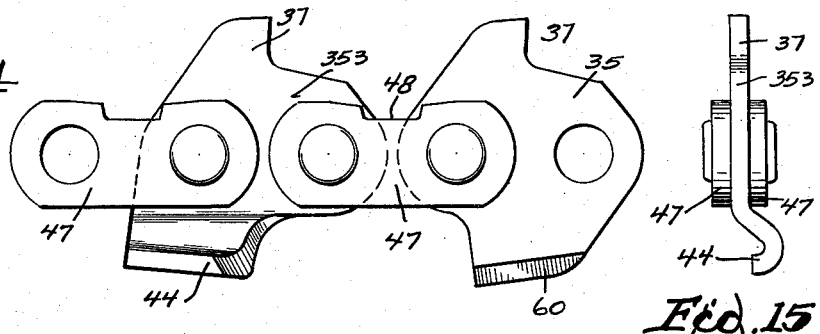
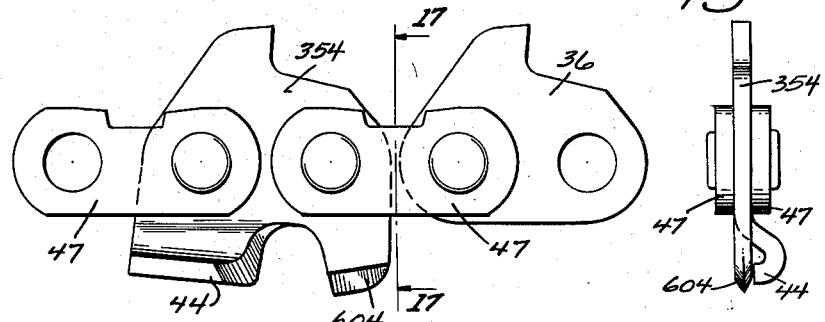
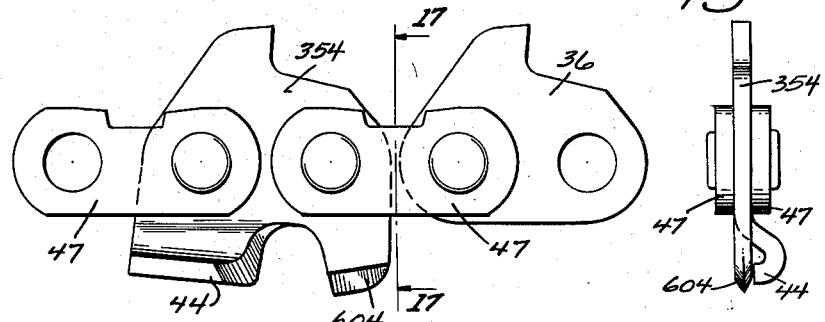
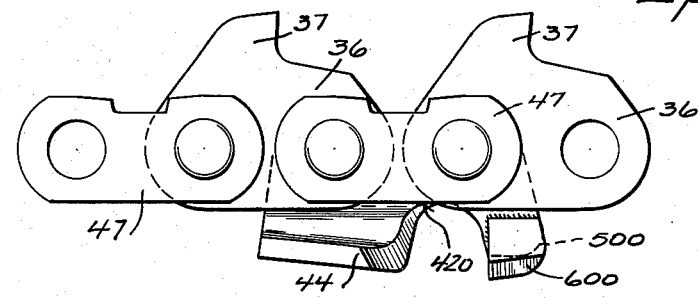
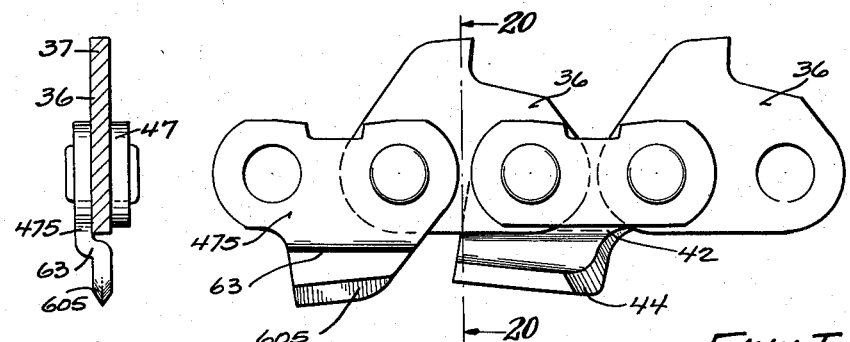

2,989,096
SAW CHAIN WITH A CENTER SCORING
GUIDE CUTTER
Finn T. Irgens, Milwaukee, Wis., assignor to Outboard Marine Corporation, Waukegan, Ill., a corporation of Delaware
Filed May 23, 1958, Ser. No. 737,238
6 Claims. (Cl. 143—135)

This invention relates to a saw chain with a center scoring guide cutter.

Most saw chains currently in use are provided with router type chip cutting teeth and depth gauges limiting the penetration of such teeth. In the instant device, the provision of a depth gauge is optional, the primary objective being to provide for the cleaner separation of the successive chips without splintering regardless of the character of the wood, while, at the same time, guiding the chain more accurately to confine it to a predetermined plane of cut and substantially eliminating lateral wandering and binding.

These objectives are achieved through the use of scoring cutters which precede the chip cutting teeth and are desirably centered with reference to the kerf cut by the chain. These cutters facilitate separation of the chips and, by penetrating the solid wood at points in advance of chip cutting, they strongly resist the type of lateral displacement of the chip cutting teeth which is commonly occasioned by vibration or by the engagement of a chip cutting tooth with a difficult wood grain.

A variety of embodiments and combinations are disclosed in the accompanying drawings, mostly for illustrative purposes, it being difficult to show all potential combinations. The scoring blades are shown attached to, or integral with, various types of links and may be mounted upon, or comprise part of, the same links which carry the chip cutting teeth, or links which are separate from the links which carry the chip cutting teeth.

In practice, depth gauges as such may be omitted since the scoring blade will ordinarily have limited penetration which, varying in different types of wood, will automatically vary the penetration of the chip cutting blades in accordance with the requirements of the work. This is something that a depth gauge tooth is inherently incapable of doing.

In the drawings:

FIG. 1 is a fragmentary view in side elevation of a section of saw chain embodying the invention, a portion of a channeled bar of a chain saw being fragmentarily illustrated, partially in section.

FIG. 2 is a fragmentary bottom plan view of a portion of the chain saw in FIG. 1.

FIG. 3 is a detail view taken on the line 3—3 of FIG. 1, portions of the work being shown in section.

FIG. 4 is a detail view in side elevation of a single link of the chain shown in FIG. 1.

FIG. 5 is a view in side elevation of another link of the chain shown in FIG. 1.

FIG. 6 is a view in side elevation of another link of the chain shown in FIG. 1.

FIG. 7 is a view in side elevation of still another link of the chain shown in FIG. 1.

FIG. 8 is a view in side elevation of the remaining link of the chain shown in FIG. 1.

FIG. 9 is a view in side elevation showing a modified link embodiment of the invention.

FIG. 10 is a view in end elevation of the link shown in FIG. 9.

FIG. 11 is a view in side elevation showing a link modified from the embodiment of FIG. 7.

FIG. 12 is a view in end elevation of the link shown in FIG. 11.

FIG. 13 is a fragmentary detail view in end elevation of a modified embodiment of the link shown in FIG. 6.

FIG. 14 is a view in side elevation of a fragment of a modified chain embodying the invention.

FIG. 15 is a view taken in section on the line 15—15 of FIG. 14.

FIG. 16 is a view in side elevation of a further modified embodiment of a chain incorporating the invention.

FIG. 17 is a view taken on the line 17—17 of FIG. 16.

FIG. 18 is a fragmentary view in side elevation of another type of chain embodying the invention.

FIG. 19 is a view in side elevation of a further modified embodiment of a chain incorporating the invention.

FIG. 20 is a detail view taken in section on the line 20—20 of FIG. 19.

In all the embodiments of FIGS. 1 through 20 inclusive, the saw chain commonly used is of a type having center links and side links. These links are commonly made by stamping flat blanks of sheet metal with which the guide lugs, router teeth, depth gauges, etc. are ordinarily integral. While it is frequently the practice to mount one or more of these items on a single link, it is more usual to have them on separate links.

In the chain shown in FIG. 1, the center links 35 and 36 are both provided with guide lugs 37 which ride in the slot 38 of the bar 40 in accordance with conventional practice. Side links 41 and 42 are provided with router teeth and are identical except that they are allochiral, the link 41 being used on the right-hand side of the chain as viewed in the direction of travel and having a router tooth 43, while the link 42 is used on the lefthand side of the chain as viewed in the direction of travel and has a router tooth 44, the two router teeth being respectively hooked to extend toward the median plane of the chain, desirably (but not necessarily) terminating short of such plane. Each such router tooth desirably has a shank portion 34 extending outwardly away from the median plane of the chain and from the end of which the tooth proper projects inwardly as best shown in FIG. 3. Where either of the links 41 or 42 is used, the side link in the other side of the chain is of the type shown at 47 and separately illustrated in FIG. 5, or of the type shown at 49 and separately illustrated in FIG. 7. Also, there is one point in each sequence of links where two of the side links 47 are paired together at both sides of the chain as shown at the center in FIG. 1. The links 47 and the corresponding margins of links 41 and 42 have tooth-receiving notches at 48 to receive the teeth of the sprocket (not shown), whereby the chain is propelled in accordance with conventional practice.

Certain of the teeth 47 are preferably modified further as indicated by the tooth 49 in Figs. 1 and 7 to provide a depth gauge 50 which limits the penetration into the workpiece of the next ensuing router tooth 43 or 44.

Thus far the chain illustrated in the drawings is in general conformity with conventional practice. However, in accordance with the present invention, a scoring guide cutter in the form of a slitting blade 60 is desirably provided in advance of each router tooth, or at least each allochiral pair of router teeth, to slit the work, desirably at a point substantially at the center of the kerf 45 as shown in FIG 3. The form of each router tooth 43, 44 is desirably such that it forms a chip which starts at the side of the kerf and is progressively severed from the work toward the center line. If the work has been scored or slit along the center line, regardless of whether the cutting of the chip is initiated at the side of the kerf or near the center line, the chip will separate cleanly from the work at the slit, thereby reducing splintering and fraying and facilitating discharge of the chip from the kerf. This also tends to reduce the power requirement and tends to reduce chattering of the chain in the kerf.

However, an even greater deterrent to chattering or lateral vibration of the chain in the kerf is the interlocking engagement of the slitting or scoring blade 60 with the work. This engagement is of the order diagrammatically illustrated in FIG. 3, and it will be apparent that nothing but the strongest of lateral pressure will in any manner displace the saw chain from travelling rectilinearly through the kerf. This again minimizes power requirements and actually reduces very substantially the width of the kerf, since the kerf tends to be limited in width to the actual over-all width of the saw chain itself. In the prior art practice, the kerf has frequently greatly exceeded the actual width of the saw chain due to lateral deflection or vibration of the saw chain.

Depending on the hardness of the wood and the type of grain, the scoring or slitting blade 60 will penetrate the wood to a lesser or greater degree. Since these same factors have a bearing upon the depth of cut which can be appropriately made by the router teeth, it will be apparent that the blades 60 are capable of automatically regulating router tooth penetration, making it unnecessary to file the saw specially for different types of wood. By the same token, the depth gauges 50 are not required and can be completely omitted, it being preferred that when the various links are pivotally connected to constitute the chain as shown, the links 49 will be replaced throughout the chain by the links 47 of FIG. 5.

The router teeth 43 and 44 have their maximum penetration into the work at their forward cutting edges 61 and are relieved both vertically and laterally in a rearward direction in accordance with conventional practice. However, the slitting or scoring blades 60 have V-shaped cutting margins 62 which may be curved at 62' like a sled runner near the leading end 35' of the link 35 and which are desirably of progressively increasing depth rearwardly of the direction of travel so that the blades can progressively cut into the work to reach the full depth shown in FIG. 3. A line connecting the centers of the rivet holes of the link 35 may be regarded as defining the center line of the link from which the projection of the cutting edge 62 increases progressively toward the trailing end of the link.

In the construction described with reference to FIGS. 1 to 8, the depth gauges and allochiral router teeth and the scoring or slitter blades contemplated by this invention are all mounted on separate links. This is not necessarily required. In FIGS. 9 and 10, a side link 420 carrying its router tooth 44 as above described is also provided integrally at its forward end with a depth gauge portion 500 to which a blade 600 is welded to lie substantially in the central plane of the chain and to cut its score or slit at the center of the kerf in accordance with the preferred practice of the invention. The separate fabrication of the blade 600 permits it to be made of special hard alloy which could not otherwise be used if the slitting blade were integral with the link.

In the construction of FIGS. 11 and 12, the separately prefabricated slitting blade 601 is welded on the side of the depth gauge 501 of a link 491 which is otherwise identical with the link and depth gauge of FIG. 7. In the constructions of FIGS. 9 to 11, the depth gauge may continue, in each instance, to perform its original function of providing an absolute depth beyond which the router teeth cannot penetrate even though in ordinary practice, the slitting or scoring blades may not even permit the router teeth to penetrate as deeply as the ultimate limit to which the depth gauge is fixed.

FIG. 13 is, in one sense, an arrangement converse to that shown in FIGS. 11 and 12, the depth gauge 502 being, in this instance, welded at the side of a blade 60 which is integral with a link 35 as shown in FIG. 6.

In all of the constructions thus far described, the allochiral router teeth have been mounted on side links. FIGS. 14 and 15 show an arrangement in which each router tooth is mounted on a center link 353 connected between other links such as the link 35 of which the scoring or slitter blade 604 is a part as shown in FIG. 16.

Instead of having the routing teeth and slitting blades on separate center links as shown in FIGS. 14 and 15, they may be mounted on the same center link 354 as shown in FIGS. 16 and 17, there being no change otherwise in the router teeth or scoring guides.

FIG. 18 simply shows incorporated in a fragment of chain a link 420 which includes a router tooth, a depth gauge portion, and a scoring or slitting blade 600 as already described in connection with FIGS. 9 and 10.

FIGS. 19 and 20 show a construction in which the slitting or scoring blade 605 is mounted on one of the side links 475 and offset at 63 toward the median plane of the chain. The associated center links 36 are as shown in FIG. 8, and the associated router side links 42 are as shown in FIGS. 1 and 4.

All of the devices disclosed feature a slitting or scoring blade which not only effects a preliminary cut in the work, but steadies the chain to substantially eliminate lateral chatter, to minimize the width of the kerf and to reduce power requirements.

I claim:

1. A saw chain comprising pivotally connected links, certain of said links being provided with slitter blades having sharpened edges projecting away from the respective links in alignment with each other and traversing a common path to slit the work substantially on the median plane of the chain, and certain of said links having allochiral chip-cutting router teeth with shanks at the outside of the chain and toe portions projecting from the respective shanks toward the path of the slitter blade edges, each such router tooth being preceded in the chain by one of said slitter blades, the said blades tending to lock the chain against lateral displacement respecting the work and to cut into the work in advance of successive router teeth to facilitate the separation from the work of chips cut by the router teeth.

2. The saw chain of claim 1 in which the links comprise center links and paired side links, the router teeth being mounted alternately on opposite side links, and the slitter blades being mounted on center links.

3. The chain of claim 1 in which the said blades are respectively mounted on links which also carry router teeth.

4. A saw chain comprising pivotally connected center links alternating with paired side links, allochiral router teeth mounted on respective side links alternately at opposite sides of said pairs of links and having lateral supporting shanks from which said teeth project inwardly, depth gauge means mounted on certain of said pivotally connected links and adapted to limit the depth of cut of successive router teeth, and scoring blades on center links preceding each of said router teeth and aligned substantially on the center line of the chain to traverse the same path and having medially directed wedge-shaped cutting edges adapted to slit the work acted on by the chain in advance of the action of successive router teeth on such work, whereby to facilitate router tooth action and to limit lateral displacement of the chain in the course of such action, said router teeth having free side margins remote from their respective shanks and proximate the path of preceding scoring blades.

5. The chain of claim 4 in which the depth gauge means and said blade are connected with each other and have a common mounting on a respective center link.

6. The chain of claim 5 in which the depth gauge means is integral with the link, and the blade comprises a hardened alloy member welded to the depth gauge means and projecting therebeyond.

(References on following page)

References Cited in the file of this patent

UNITED STATES PATENTS

| | | |
|---|---|---|
| 2,326,854 | Hassler | Aug. 17, 1943 |
| 2,508,784 | Cox | May 23, 1950 |
| 2,515,550 | Ciba | July 18, 1950 |
| 2,565,502 | Johanson | Aug. 28, 1951 |
| 2,651,336 | Warren | Sept. 8, 1953 |
| 2,755,828 | Dunnington | July, 24, 1956 |

FOREIGN PATENTS

| | | |
|---|---|---|
| 822,900 | Germany | Nov. 29, 1951 |
| 913,955 | Germany | June 24, 1954 |